United States Patent
Belliveau

[19]

[11] Patent Number: 6,048,080
[45] Date of Patent: Apr. 11, 2000

[54] LIGHTING SYSTEM WITH VARIABLE SHAPED BEAM

[75] Inventor: Richard S. Belliveau, Austin, Tex.

[73] Assignee: High End Systems, Inc., Austin, Tex.

[21] Appl. No.: 08/834,668

[22] Filed: Apr. 1, 1997

Related U.S. Application Data

[63] Continuation of application No. 08/500,693, Jul. 11, 1995, Pat. No. 5,758,955.

[51] Int. Cl.[7] .................................................. F21V 17/02
[52] U.S. Cl. ......................... 362/282; 362/322; 362/332; 359/621; 359/821
[58] Field of Search ................................. 353/81, 84, 88, 353/97, 100–102; 359/234, 235, 619, 621, 622, 624–626, 628, 799, 800, 813, 814, 888, 889, 455–458, 821; 362/280–284, 293, 294, 268, 322–324, 332

[56] References Cited

U.S. PATENT DOCUMENTS

| | | | |
|---|---|---|---|
| 1,761,361 | 6/1930 | Oberg et al. | 353/101 |
| 1,973,203 | 9/1934 | Goldberg | 359/821 |
| 2,531,956 | 11/1950 | Waldorf et al. | 359/821 |
| 2,588,373 | 3/1952 | Erban | 359/455 |
| 3,202,047 | 8/1965 | Lawler | 359/821 |
| 3,260,152 | 7/1966 | Aston | 355/35 |
| 3,484,599 | 12/1969 | Little | 359/622 |
| 4,104,707 | 8/1978 | Schneider | 362/17 |
| 4,118,109 | 10/1978 | Crawford et al. | 359/196 |
| 4,208,100 | 6/1980 | Bischl | 359/234 |
| 4,232,359 | 11/1980 | Leon et al. | 362/268 |
| 4,369,488 | 1/1983 | Brun | 362/280 |
| 4,627,690 | 12/1986 | Fantone | 359/669 |
| 4,697,227 | 9/1987 | Callahan | 362/233 |
| 4,779,176 | 10/1988 | Bornhorst | 362/223 |
| 4,824,191 | 4/1989 | Kato et al. | 359/19 |
| 4,914,556 | 4/1990 | Richardson | 362/293 |
| 4,961,087 | 10/1990 | Gandini et al. | 359/821 |
| 4,984,143 | 1/1991 | Richardson | 362/293 |
| 4,991,063 | 2/1991 | Stoneham | 362/282 |
| 5,216,534 | 6/1993 | Boardman et al. | 359/821 |
| 5,282,121 | 1/1994 | Bornhorst | 362/294 |
| 5,515,254 | 5/1996 | Smith et al. | 362/293 |
| 5,703,729 | 12/1997 | Takeda et al. | 359/821 |
| 5,758,955 | 6/1998 | Belliveau | 362/293 |

FOREIGN PATENT DOCUMENTS

| | | |
|---|---|---|
| 0 017 210 A1 | 3/1980 | European Pat. Off. . |
| 796416 | 6/1958 | United Kingdom 353/102 |
| 1261889 | 1/1972 | United Kingdom . |
| 1545007 | 4/1979 | United Kingdom . |
| 2063447 | 11/1979 | United Kingdom . |
| 2264164 | 2/1992 | United Kingdom . |

*Primary Examiner*—Alan Cariaso

[57] ABSTRACT

A lens for use in a light fixture provided to project a beam of light in a first light pattern having a first cross-sectional geometry. A lenticular lens element is supported in the fixture and movable into a position to interrupt the beam of light for selecting beam shape by altering the first projected light pattern from the first cross-sectional geometry to a second cross-sectional geometry different from the first geometry and for moving the second pattern to a desired orientation. The lens element may be carried by a disc rotatably mounted in the fixture. The disc may carry a plurality of lens elements which can also change the orientation of the projected light patterns.

6 Claims, 10 Drawing Sheets

LIGHTING SYSTEM WITH VARIABLE SHAPED BEAM

RELATED APPLICATION

This application is a continuation of application of U.S. patent application Ser. No. 08/500,693 filed on Jul. 11, 1995, now U.S. Pat. No. 5,758,955 for LIGHTING SYSTEM WITH VARIABLE SHAPED BEAM.

FIELD OF THE INVENTION

This invention relates generally to stage and theater lighting fixtures and more particularly to a color wash luminaire which provides variable intensity, variable color, variable positioning and variable beam angles in a single compact fixture.

BACKGROUND OF THE INVENTION

Wash lights, as they are generally known, are used to provide uniform illumination and coloration to a theatrical set. Numerous lighting fixtures have been provided in the past wherein the output of the light source and reflector are selectively colored by the positioning of one or more colored media in front of the light beam. Some of these applications have included a strip of media moved across a light beam, a scrolling variable density gel media device, and gradient density color wheels. None of these variable density filters address or consider the power density of the light beam. They do not compensate for the non-linear distribution of light intensity across a light beam which results from the use of a more efficient elliptical reflector, As a result, when used with such a reflector. A linear distribution color wheel will provide a nonlinear coloration of the light beam, which is darker at the edges and perceptibly lighter toward the center of the beam. A ratio of power from center of beam to beam edge is often on the order of 50%. Variable density filters which do not address the power density of the beam produce results which are non-uniform and leave an apparent white spot in the center of the beam while darkening the edge first. This accentuates the power gradient shift and makes the resultant coloration more objectionable. A further complication of this approach is that fully saturated colors cannot be used due to excessive transmission losses at fractional percentages or an exaggeration of the power density losses.

Prior art lights of the type contemplated by this invention most often utilize two moving lenses or a moving light source with a single lens and require substantial space and complex mechanical slide systems. These limitations make it difficult to provide a fixture of a compact size.

Heat dissipation is always a critical consideration in lighting fixtures, Many fixtures utilize a hot mirror reflector which is, at best, fifty percent efficient in controlling the infrared heat energy. Fan cooling is therefore typically required for an additional heat transfer capability in conventional stage and studio lighting which again detracts from a compact fixture. Also typical of such fixtures is the lack of a module based design so that, for example, the addition or removal of control and sensor functions requires redesign of the system hardware.

Lights used in a studio or for photographic purposes often project a round cross-sectional pattern of light such as that seen by the ordinary flashlight. Simple devices utilize a reflector and a lamp or utilize sealed beam lamps, such as automotive head light type lamps. These sealed lamps consist of a reflector, a lamp and a type of diffuser or lens to soften the projected spot, and sometimes to focus the projected spot from either a narrow spot or a wide flood. More complicated arrangements involve ellipsoidal reflectors or condensing systems which focus light through an aperture which is imaged by projector lenses. These types of systems commonly produce a more uniform beam of light than that of the sealed beam type. Other types of lights used include fresnel projectors, which utilize a fresnel projecting lens. The fresnel projecting lens is known to provide a beam of light that is homogenous with a gradual rolloff of light output toward the edges. Many of the things illuminated on a stage or studio do not always require a round beam of light since many stages or studio sets can often be more wide than they are tall. Illuminated subject areas often require the use of a framing projector or devices known as barn doors which can be utilized to change cross-sectional pattern or the shape of the beam by shadowing the light projected from the device as a means to change the shape of the beam.

The foregoing illustrates limitations of the known prior art. Thus it is apparent that it would be advantageous to provide alternatives directed to overcoming one or more of the limitations as set forth above. Accordingly, suitable alternatives are provided including features and benefits more fully disclosed hereinafter.

SUMMARY OF THE INVENTION

In one aspect of the present invention, this is accomplished by providing a lens for use in a light fixture provided to project a beam of light having a first light pattern of a first cross-sectional geometry. Means including a lenticular lens element is supported in the fixture and movable into a position to interrupt the beam of light, for altering the first projected light pattern from the first cross-sectional geometry to a second projected light pattern having a second cross-sectional geometry different from the first geometry.

In another aspect of the present invention, a moving light fixture includes a yoke and means for movably suspending the yoke from a support. A housing is movably connected to the yoke and has a first portion including a light source and means for removing heat generated from the light source. The housing has a second portion including a plurality of movable color filters and at least one lenticular lens, The light source is operable to project a beam of light, having a first light pattern of a first cross-sectional geometry, along a path through the color filters and a lenticular lens. Means including the lens are supported in the fixture and movable into a position to interrupt the beam of light for altering the first projected light pattern from the first cross-sectional geometry to a second projected light pattern having a second cross-sectional geometry, different from the first geometry. This provides for selectable beam shape by moving the second projected light pattern to a desired orientation.

The foregoing and other aspects will become apparent from the following description of the invention when considered in conjunction with the accompanying drawing figures. It is to be expressly understood, however, that the figures are not intended as a definition of the invention, but are for the purpose of illustration only.

BRIEF DESCRIPTION OF THE DRAWING FIGURES

DETAILED DESCRIPTION OF THE INVENTION

Figure 1:
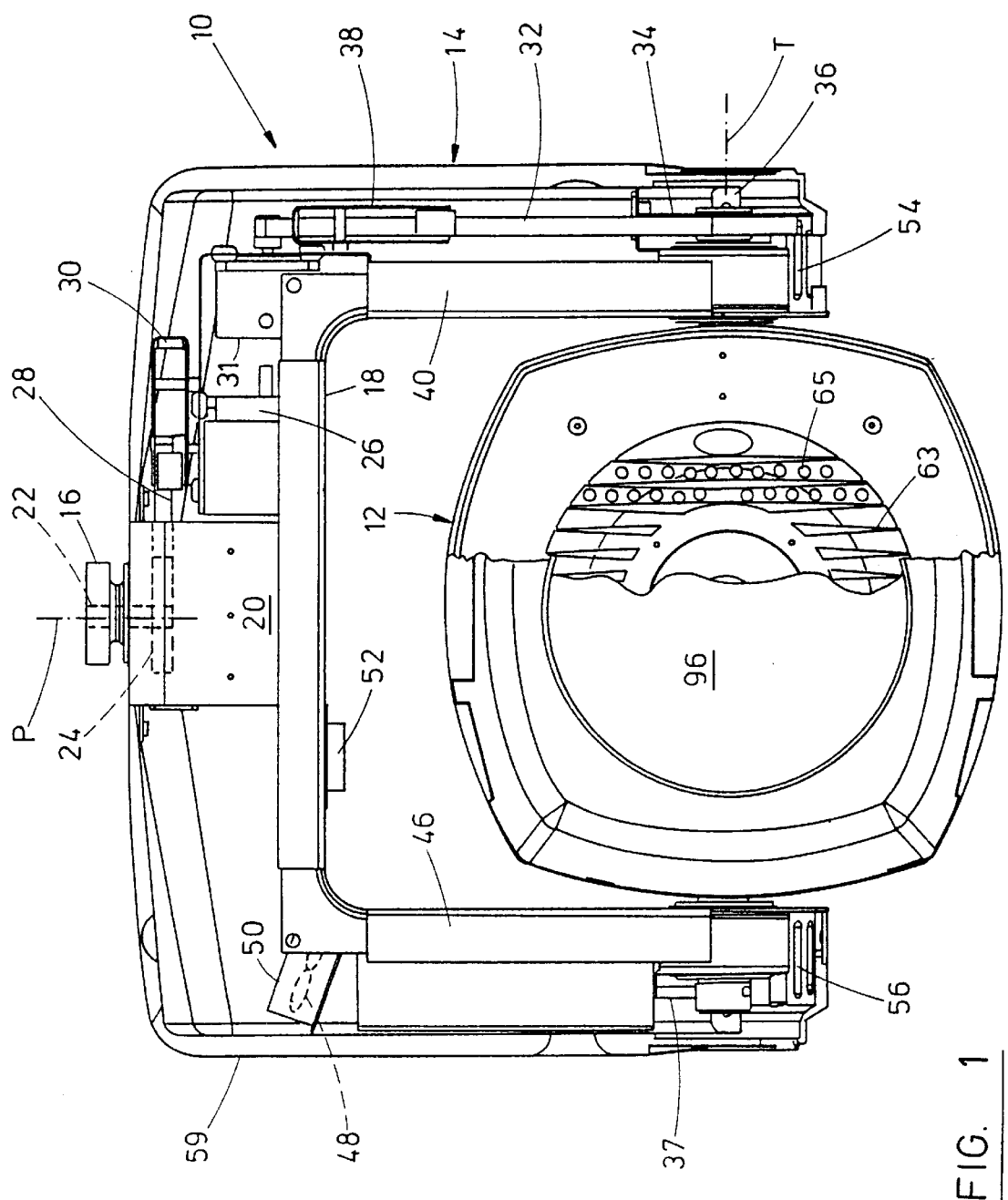
FIG. 1 is a frontal view, with partial cutaway portions, illustrating an embodiment of the luminaire of this invention.

The present invention employs a custom designed halogen light source with a compacted filament cross-section of only 10×10 mm while still providing a high wattage level of 750 Watts. To achieve this, a custom lamp has been designed to operate at a relatively low fixed voltage of 110 VAC, thereby minimizing arcing within the filament winding and allowing the more compacted filament area. Compacting of the light source in this way allows for the use of a very efficient elliptical reflector. This compacting of source cross-section when utilized in conjunction with the custom computer optimized elliptical reflector allows this luminaire to obtain very high light output comparable to that of a 1000 Watt light source, but with substantial savings in power requirements and heating. Further, it provides a concentrated small beam cross-section which is ideally suited to use with the color mixing system provided.

The present invention utilizes a unique color mix system. Color mixing is obtained through the use of a fixed color wheel which provides 5 primary colors plus white, used in combination with a new subtractive color mix system. The color mix system uses three gradient color wheels whose color distribution has a linear gradient characteristic in the circumferential direction of the rotation while the radial distribution of color is Gaussian. This patterning results in compensation for the non-linear Gaussian distribution of intensity through the light beam as results in a device of this type where an elliptical reflector is used with the light source. This Gaussian distribution results in much more uniform coloration of the light beam unlike a conventional gradient wheel which has fixed distribution in the radial direction and linear distribution in the circumferential direction of the color wheel.

The use of Gaussian distribution of color on the color wheel compensates for non-linearity of the light source in an inverse fashion, thereby providing for a coloration of the beam which is essentially linear across the light beam. The color mixing system of the present invention provides for 167,000,000 color possibilities (6 colors on main color wheel×256 gradient colors/wheel cubed for 3 wheels=167 million color permutations). An additional wheel may be provided for the purposes of incorporating mechanical dimming of the light source where the resultant color temperature shift that occurs with electronic dimming of the lamp is not desired.

In this invention, three dichroic color filters, magenta, cyan and yellow, are utilized where the gradient colored portions of these filters are patterned to be coincident with the inverse of the power gradient of the source. That is, the color filter gradient is greatest toward the center of the arc where it crosses the maximum power point of the source, dropping proportionally to the outer edge of the gradient wheel and light beam. Saturation of the color pattern increases proportionally as the filter is rotated further, culminating in 100% saturation at 300 degrees of the angular travel. The "gradient" of the filter can be achieved through multiple small "fingers" of color whose width is varied proportional to the angular travel or, alternatively, where a printed pattern is increased in density as the angular travel is increased. In all cases, the coloration of the filter is concentrated toward the center of the filter arc coincident with the wheels travel over the point of maximum power gradient of the light source. The construction of the gradient wheel also includes a beam cut-out located in a position where the beam will pass through when only white light is desired. This eliminates the loss due to passing through the glass substrate when maximum white light out put is desired.

This invention also includes a rotating lens device including a lenticular lens element movable into a position to interrupt the beam of light for selecting beam shape by altering a circular beam pattern to an ellipsoidal beam pattern and for moving the ellipsoidal beam pattern to a desired orientation.

This invention further includes a unique approach to the mechanical considerations of a lighting system which comprises an optimized reflector/heat sink assembly and IR filter assembly to direct and control heat generated by its incandescent light source. The assembly incorporates a spun aluminum reflector mounted in the heat sink assembly. The resultant concentrated light beam is directed to a pair of angularly mounted dichroic filters which redirect the IR portion of the light beam into integral internal heat sinks. The internal sinks capture the IR energy from the light source and conduct it to the outer portion of the integral sink assembly. The external fins of the heat sink assembly are oriented vertically to the plane of movement of the fixture, providing optimized convection and dissipation of the heat from the internal source. This arrangement provides approximately 85% reduction of heat between the rear chamber and the optical section. The heat sink assembly also provides the mechanical basis for the remainder of the mechanical system, providing a high integrity structure from which the remaining secondary assemblies are mounted. In addition, a heat blocking wall is provided in the front portion of the heat sink/reflector assembly which further isolates the lamp heat from the remaining electronic and optical components located in the front portion of the fixture. The front optical section is shrouded by a high impact plastic bezel which allows for easy access to the mechanical and optical systems for service and/or maintenance.

Figure 2:
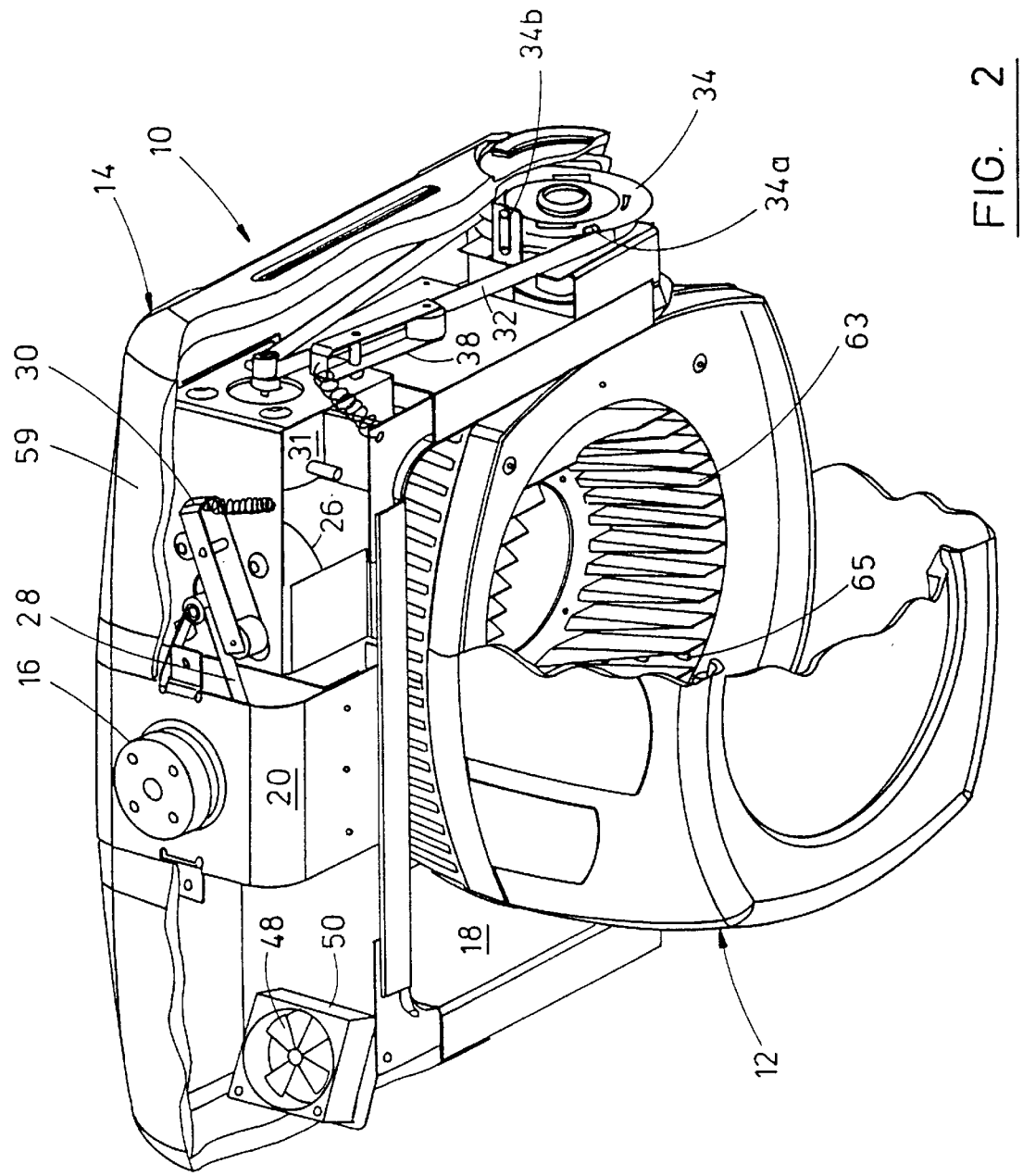
FIG. 2 is a perspective view, with partial cutaway portions, illustrating an embodiment of the luminaire of this invention.

Referring now to the drawings, FIGS. 1 and 2 illustrate the wash luminaire of the present invention, generally designated 10. Luminaire 10 comprises a housing 12 connected to a yoke 14 which may be suspended from a supporting truss (not shown) by means of a clamp (also not shown) attached to yoke 14 at connector 16.

Yoke 14 comprises a suitable metal frame 18 including a metal bracket 20 to reinforce yoke 14. Connector 16 is bearing mounted and connected by means of a shaft 22 to a gear 24 positioned adjacent bracket 20. Gear 24 includes a notch (not shown) which operates with an adjacent position sensor (not shown) for pan position control. A motor 26, supported by frame 18, drives belt 28 to rotate gear 24 for the purpose of providing a 360 degree rotation about the centroidal axis P of shaft 22. This provides the pan capability to luminaire 10. A suitable idler arrangement 30 is provided to engage belt 28.

Another motor 31, also supported by frame 18, drives belt 32 to rotate gear 34 for the purpose of providing at least a 270 degree rotation about the centroidal axis T of a shaft 36. Similar to gear 24, gear 34 includes a notch 34*a* which operates with an adjacent position sensor 34*b* for tilt position control. This provides the tilt capability to luminaire 10. Another suitable idler arrangement 38 is provided to engage belt 32. A travel stop 37 is connected to the tilt mechanism to limit movement of luminaire 10 to a desired tilt angle.

A manual off-on switch or breaker 52 is also mounted externally on yoke 14. A cooling fan 48 mounted in a housing 50 is operable to draw cooling air into yoke 14 through a plurality of vents 54, across the internal components of yoke 14, and outwardly through a similar plurality of vents 56. A cover 59, formed of a rigid synthetic material, which includes vents 54 and 56, encloses yoke 14 and the above described components.

Figure 3:
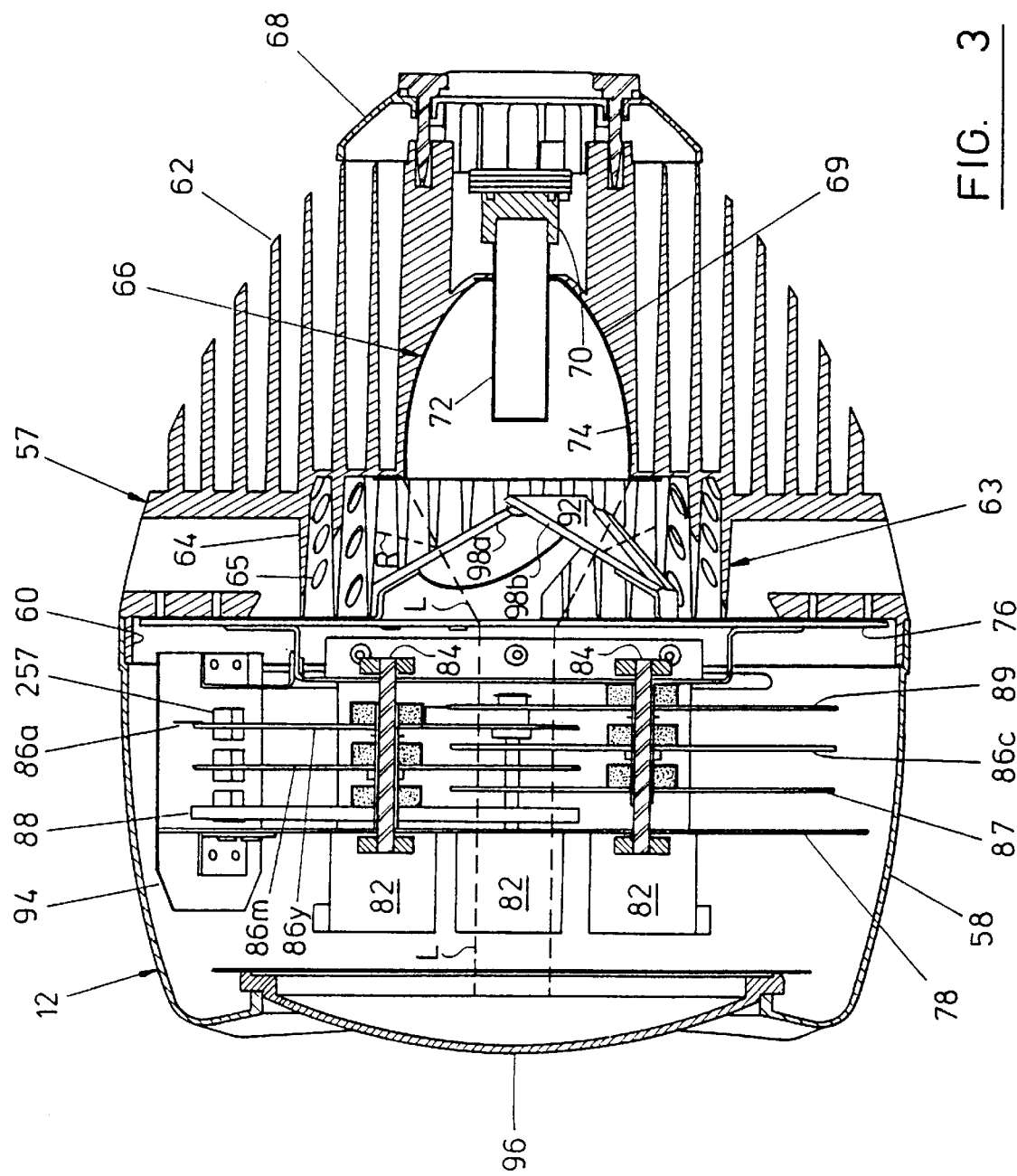
FIG. 3 is a cross-sectional view, illustrating an embodiment of the housing of this invention.
Figure 4:
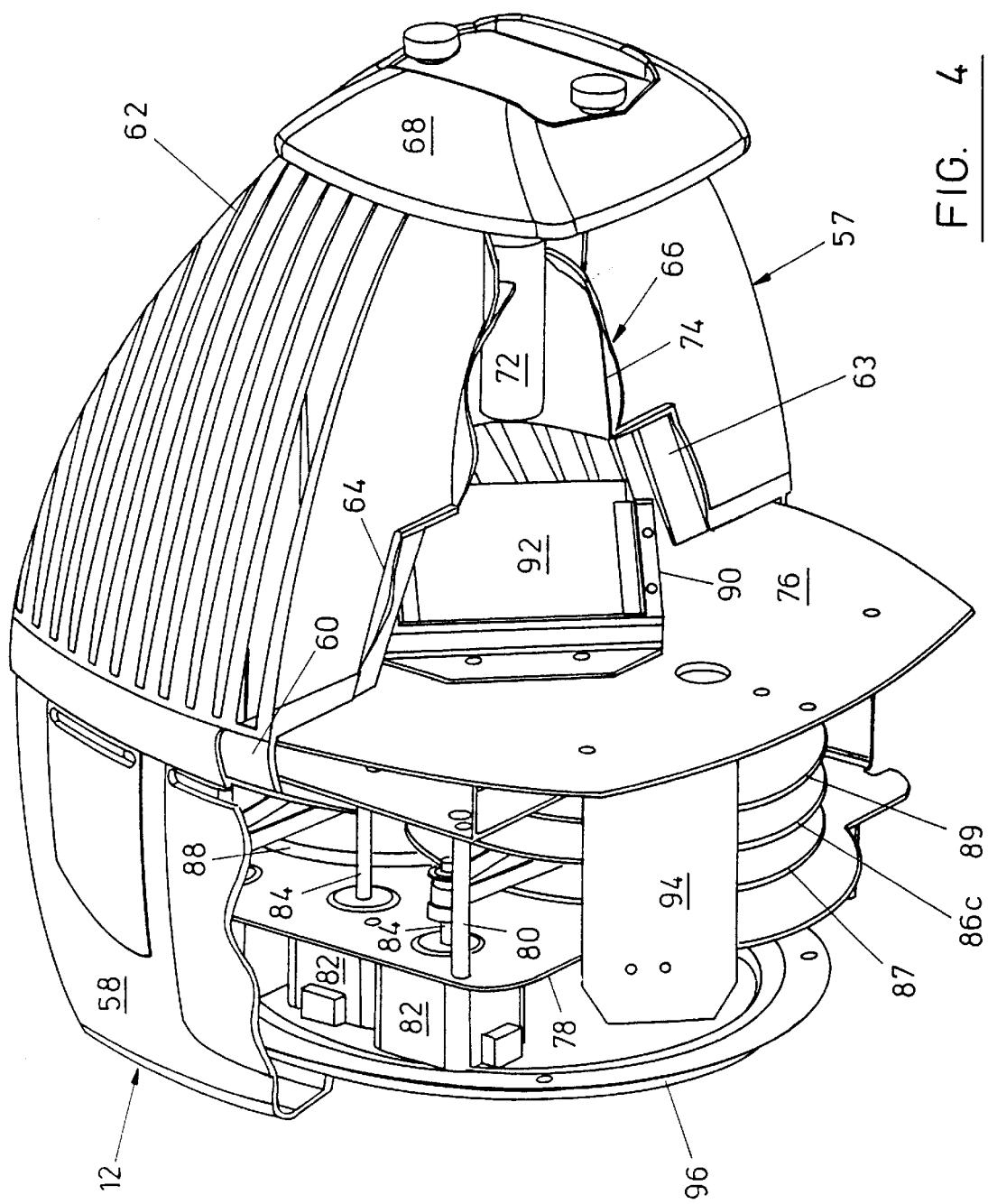
FIG. 4 is a perspective view, with partial cutaway portions, illustrating an embodiment of the housing of this invention.
Figure 5:
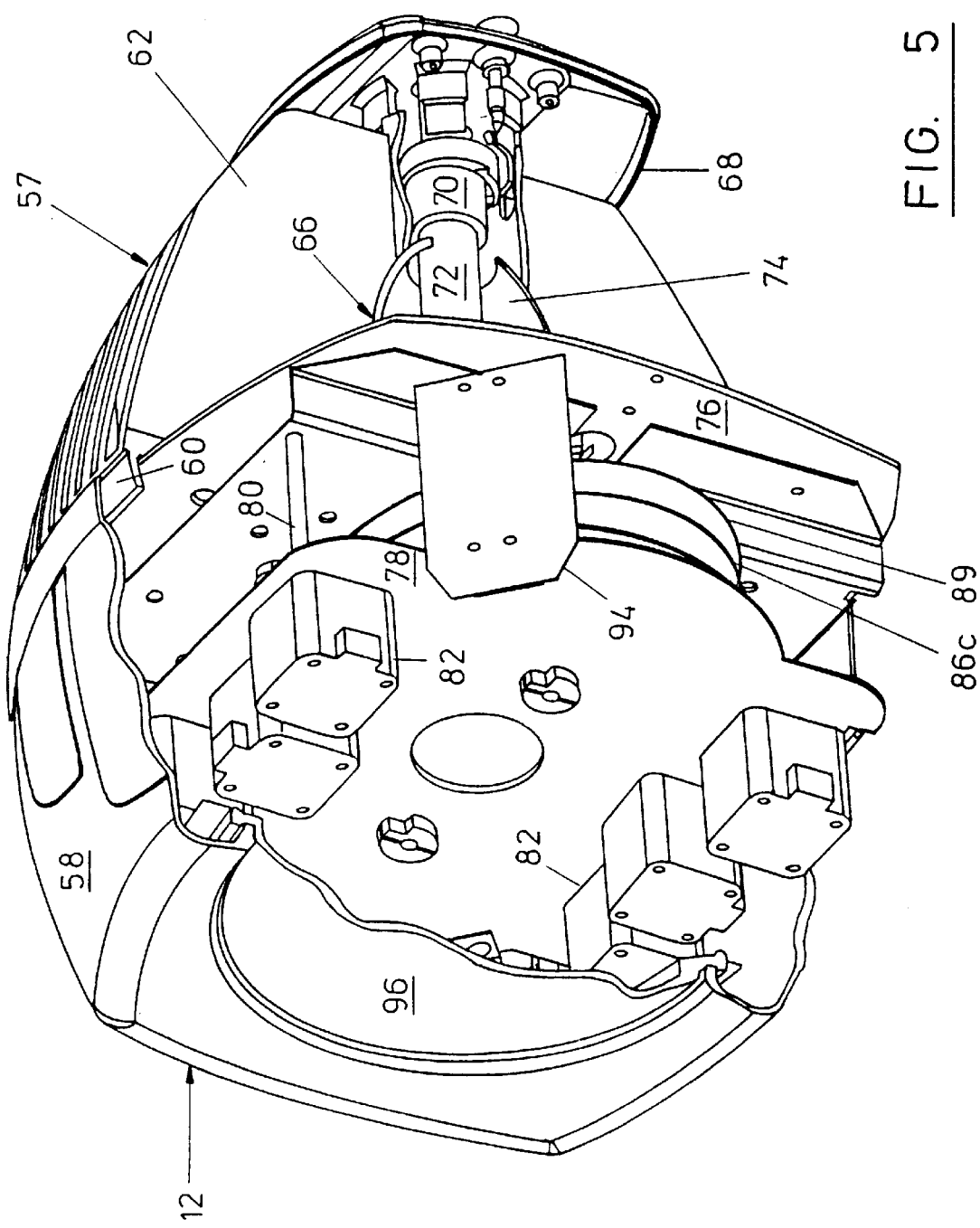
FIG. 5 is another perspective view, with partial cutaway portions, illustrating an embodiment of the housing of this invention.

In FIGS. 3, 4, and 5, housing 12 is illustrated and generally comprises an aluminum casting 57 and a bezel 58, formed of a suitable rigid synthetic material. Casting 57 includes a base 60, at a first end, from which a first plurality of contoured external cooling fins 62 extend. A stepped annular relief 66 is provided within casting 57 and includes an annular portion 64 and a truncated elliptical portion 69. Annular portion 64 also includes cooling vents 65. A second plurality of internal cooling fins 63 are disposed about an inner annular periphery of annular portion 64. First and second fins 62, 63, respectively, are aligned.

An aluminum end cap 68 is mounted on a second end of casting 57. A lamp base 70 and lamp 72 are mounted on end cap 68. Lamp 72 extends into open annular relief 66. An elliptical reflector 74 is also mounted in elliptical portion 69 so as to suitably surround lamp 72. Lamp 72 is powered by AC power in a conventional manner.

An aluminum heat blocking wall, or hot plate 76, is mounted on the first end of casting 57, and is spaced from a motor mounting plate 78 by spacer elements 80. A plurality of motors 82 are mounted on motor mounting plate 78 and rotating shafts 84, extending from motors 82, are operable to be belt driven to rotate a plurality of staggered color filters 86, a rotating lens 88, a mechanical dimming wheel 89, and a frost wheel 87. Tabs, such as tab 86*a*, on color filter 86, are provided on these shaft mounted, rotating lenses, filters, etc., to operate with a plurality of respective adjacent position sensors 257 mounted on a pair of motor/driver sensor boards 94 mounted between plates 76, 78 for the purpose of sensing the positions of each of the shaft mounted rotating devices including color wheels 86, etc.

Light beam L, FIG. 3, is condensed to a diameter of about 1.25 inches in diameter where it exits casting 57 at hot plate 76. The beam then passes through the series of wheels; color filters, lens, etc. In the embodiment of FIG. 3, bezel 58 houses a series of 6 wheels. Dimming wheel 89, dichroic coated color filter (yellow), 86*y*, dichroic coated color filter (cyan) 86*c*, dichroic coated color filter (magenta) 86*m*, rotating lens 88 and frost wheel 87. Three of these wheels are mounted on shaft 84 and another three are mounted on a corresponding shaft 84. The 2 sets of 3 wheels are interleaved, i.e. partially overlapped, in known fashion, to optimize the number of surfaces exposed to beam L. The positions of the three wheels on one shaft 84 are sensed by their respective sensors 257 on one of the boards 94, and the positions of the other three wheels on the other shaft 84 are similarly sensed by their respective sensors 257.

Dimming wheel 89 is used to attenuate the light and is a dichroic coated glass substrate identical in patterning (discussed later) to the color filters 86 except that the coloration is done with an aluminum or silver coating so that it transmits a percentage of light and reflects a percentage. Dimming wheel 89 can be interchanged with a conventional color wheel if desired. Frost wheel 87 provides variable frost (softens the light) due to five trapezoidal sections of acid etched glass. Each section is etched to a different degree to provide variable frost. A sixth and final section of the frost wheel is an open position. A conventional color wheel may also replace frost wheel 87 if desired.

Figure 6:
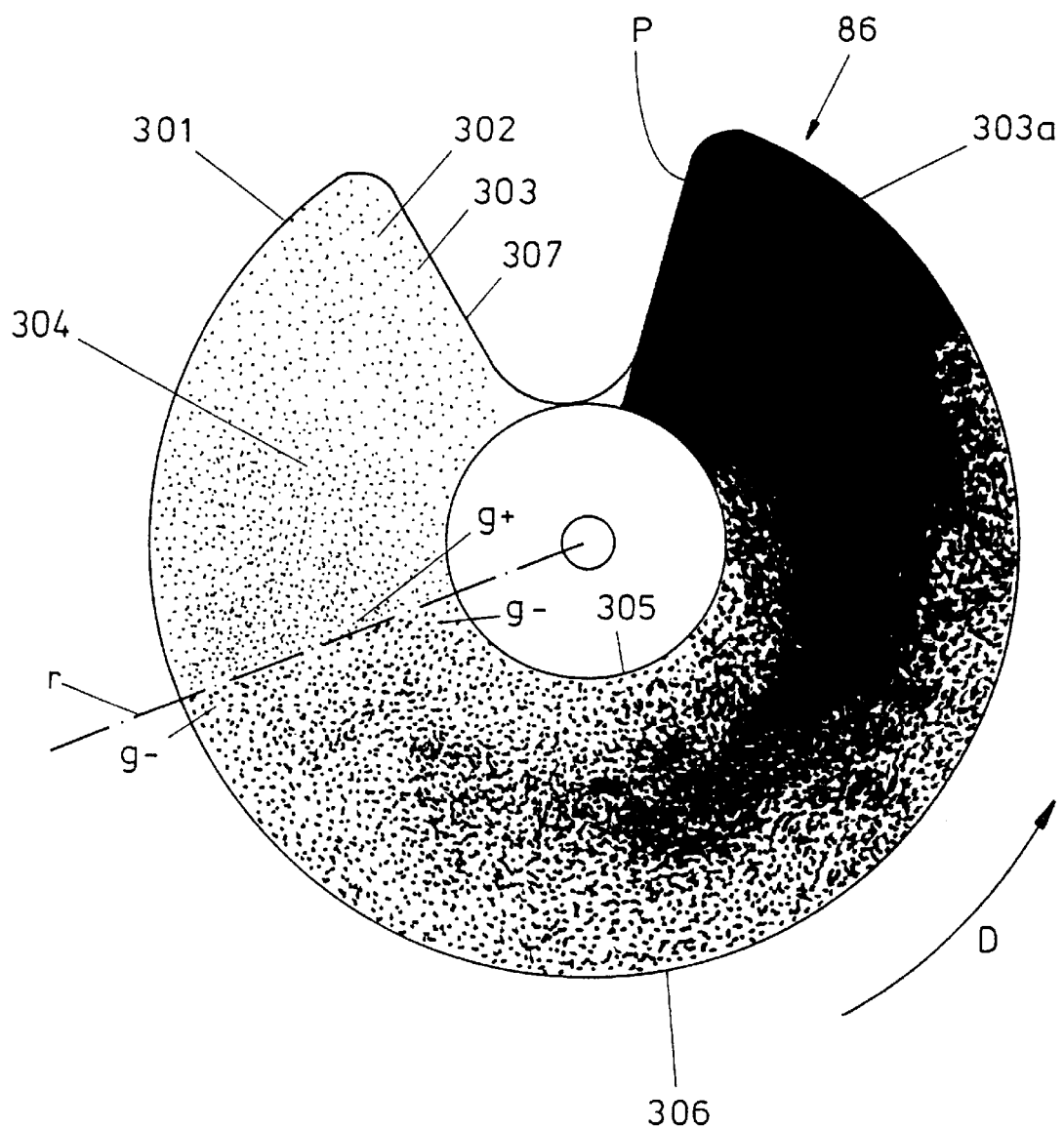
FIG. 6 is a plan view illustrating an embodiment of the color filter of this invention.

Color filters 86*y*, 86*c* and 86*m* of FIG. 6 comprise a disc-shaped boro-silicate glass substrate 301 having a planar surface 302 which includes a photolithographically etched film 303 deposited thereon. Film 303 forms a Gaussian pattern arcuate band 304 extending around a substantial portion of planar surface 302. Band 304 has an inner edge 305 and an outer edge 306 and the density of film 303 is greater in an area designated g+ along a radius r between inner edge 305 and outer edge 306 and less in an area designated g- along radius r at inner edge 305 and less in a corresponding area g- along radius r at outer edge 306. A portion of substrate 301 is cut away to form a notch 307 which interrupts arcuate band 304. A portion p of planar surface 302 adjacent notch 307 is coated with a solid film 303a having no pattern as the etched film 303 in band 304.

Color filters 86*y*, 86*c* and 86*m* are used in combination with lamp 72 to produce desired color effects. Beam L, produced by lamp 72, has a typical power gradient, which is not uniform across the beam. A ratio of power from the center of the beam to beam edge is often on the order of 50%. Known variable density filters which do not address the power gradient of the beam, produce results which are non-uniform and leave an apparent white spot in the center of the beam while darkening the beam edge which makes the coloration objectionable.

Advantageously, the Gaussian patterning of the color filters of this invention is coincident with the inverse of the power gradient of the beam L. That is, the color filter gradient is greatest toward the center of the band 304 where it crosses the maximum power point of the beam L. In this manner, the maximum power of the beam L is coincident with the maximum filtering effect of filters 86*y*, 86*c* and 86*m*.

Saturation of the Gaussian color pattern increases proportionally as the filter is rotated in a direction represented by directional arrow D, FIG. 6, culminating in 100% saturation at about 300 degrees of angular travel where portion p of planar surface 302 is coated with solid film 303*a*.

A bracket 90 is mounted on hot plate 76 to position a heat filter 92 to reflect IR radiation R back to the cooling fins 63, 62 to be dissipated from housing 12. Heat filter 92 comprises the bracket 90, FIGS. 3 and 4, which is generally of an A-frame construction and includes a first filter 98*a* mounted at about a ninety degree angle relative to a second filter 98*b*. Filter 92 is used to reflect damaging infrared radiation R away from the previously mentioned heat sensitive optical components mounted on shafts 84. Thus, these filters are at an angle to light beam L passing therethrough. The result is a reflection of IR radiation outwardly toward the fins, as is best shown in FIG. 3. First and second filters 98*a*, 98*b*, respectively are preferably formed of a suitable 1.75 mm thick substrate of boro-silicate glass material and has a thin film dichroic coating on both sides. The coating on one side facing lamp 72, will provide infrared reflectance of from about 730 nm to about 1,050 nm. The coating in the opposite side will provide reflectance of from about 1,050 nm to about 1,700 nm.

Figure 7A:
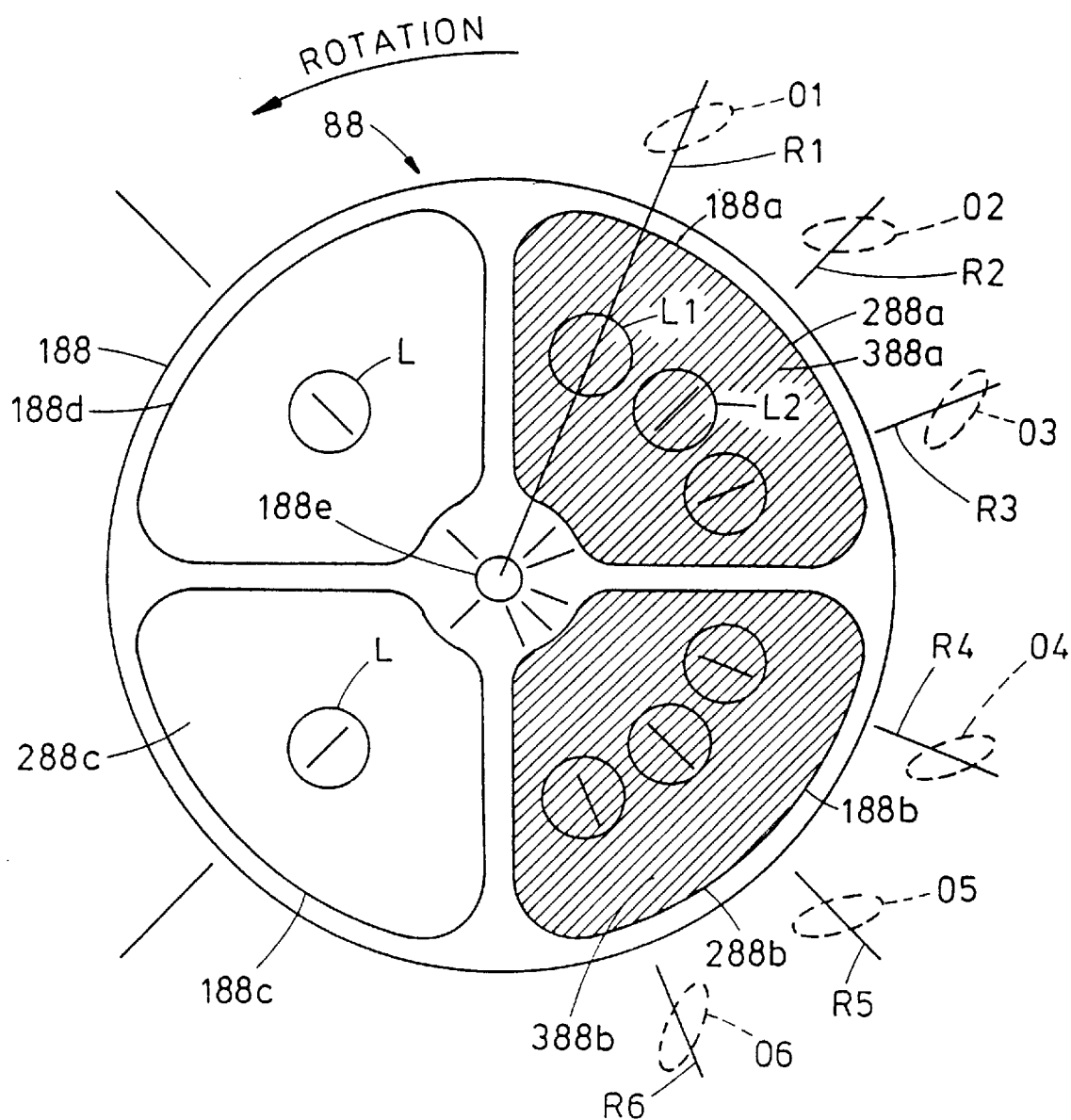
FIG. 7A is a planar view illustrating an embodiment of the rotatable lenticular lens device of this invention.

A lenticular lens device 88, FIG. 7A is rotatably mounted adjacent one side of motor mounting plate 78. Lens device 88 is mounted on one of the shafts 84 which is rotatably driven by one of the motors 82 suitably attached on another side of motor mounting plate 78. Lens device 88 comprises a disc shape and is formed of an aluminum or other suitable metal retainer 188 having a plurality of openings 188*a*, 188*b*, 188*c*, 188*d* formed therein. An aperture 188*e* in the geometric center is for receiving shaft 84 whereby lens device 88 is rotatable. One of the openings 188*a* includes a lenticular lens element 288*a* formed of a suitable high temperature glass having a plurality of substantially parallel grooves or lenticules 388*a* formed therein. Another of the openings 188*b* includes substantially the same lenticular lens element 288*b* but having the grooves or lenticules 388*b* oriented at 90 degrees relative to lenticules 388*a*. Still another of the openings 188*c* includes either a suitable well know frost material 288*c*, FIG. 7A, or alternatively a homogeneous lens element 488*c*, FIG. 7B, including an array of adjacent convex surfaces as is known. The last of the openings 188*d* remains open and contains no lens element so that the light beam passing therethrough retains its normal light pattern having a circular cross-sectional geometry. The lens elements 288*a*, 288*b*, 288*c* or 488*c* may be fixedly secured to retainer 188 by a suitable high temperature silicone based adhesive or may be removably secured by some suitable attachment device.

As it is well known, homogeneous lens 488*c* will change the magnification and increase the beam angle but will not affect the geometric shape of light beam L. Similarly, frosted lens 288*c* will diffuse and soften the beam L and spread out the beam angle but will not affect the geometric shape of the beam. Lenticular lens elements 288*a* and 288*b* will change the geometric shape of the beam from a circular to an elongated ellipsoidal shape.

Figure 7B:
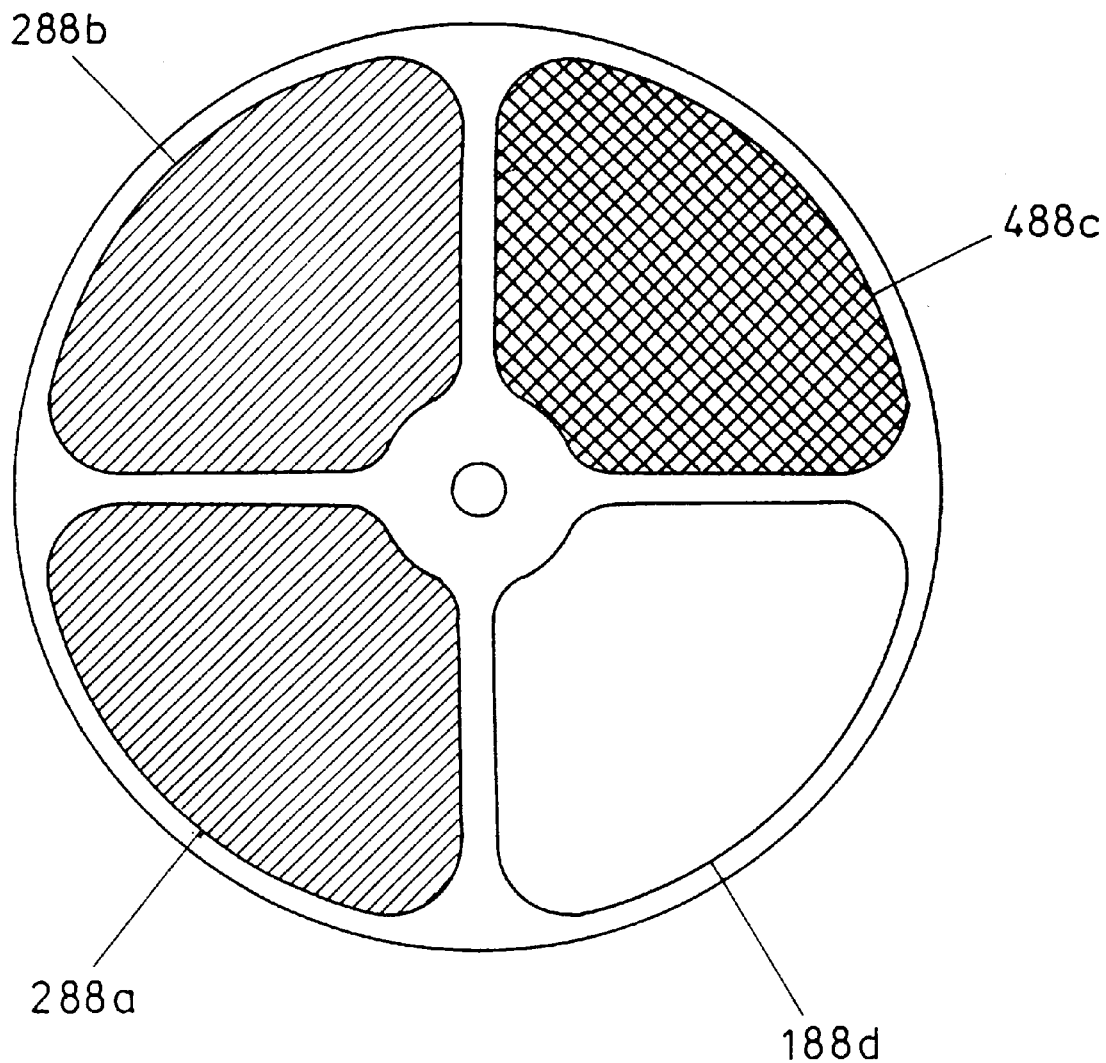
FIG. 7B is a planar view illustrating another embodiment of the rotatable lenticular lens device of this invention.

In FIG. 7A, lenticular lens device 88 is illustrated. When the device 88 is mounted in fixture 10 for rotation on shaft 84 engaged in aperture 188*e*, a fixed beam of light L passes through lens device 88 as the device 88 is rotated. When opening 188*d* is in the path of beam L, there is no affect on the beam since there is no lens in opening 188*d*. When device 88 is rotated to a position where either frosted lens 288*c*, FIG. 7A, interrupts beam L or, homogeneous lens 488*c* in the case where the embodiment of FIG. 7B is used, the beam angle is affected but the geometric shape of beam L is unchanged. However, when lenticular lens elements 288*a* and/or 288*b* interrupt the beam L, the normally projected circular geometric shape of beam L is changed to an oblong or ellipsoidal shape O as illustrated in phantom in FIG. 7A. Furthermore, as the lens device 88 is rotated through fixed beam L, the oblong shape of beam 0 changes in orientation.

For purposes of illustration only, several radii are shown in FIG. 7A and extend outwardly through six different positions where rotating lens device interrupts fixed beam L. In a first position the orientation of altered beam 01 on radius R1 is aligned with the direction of lenticules 388*a* as they extend across beam L1 which remains fixed. As viewed in FIG. 7A, the oblong projected beam 01 is slightly canted to the right with reference to radius R1. In a second position, the orientation of altered beam 02 on radius R2 is aligned with the direction of lenticules (1) 88*a* as they extend across fixed beam L2 which is actually in the same fixed position as the beam designated L or L1. As viewed in FIG. 7A, the longitudinal axis of the projected beam 02 is vertically aligned with reference to radius R2 and as the lens device 88 is further rotated, the oblong projected beam 03, 04, 05 and 06 constantly changes orientation in the direction of rotation with reference to its respective radii R3, R4, R5 and R6 due to the changing orientation of lenticules 388*a* and 388*b* extending across the fixed light beam.

Figure 8:
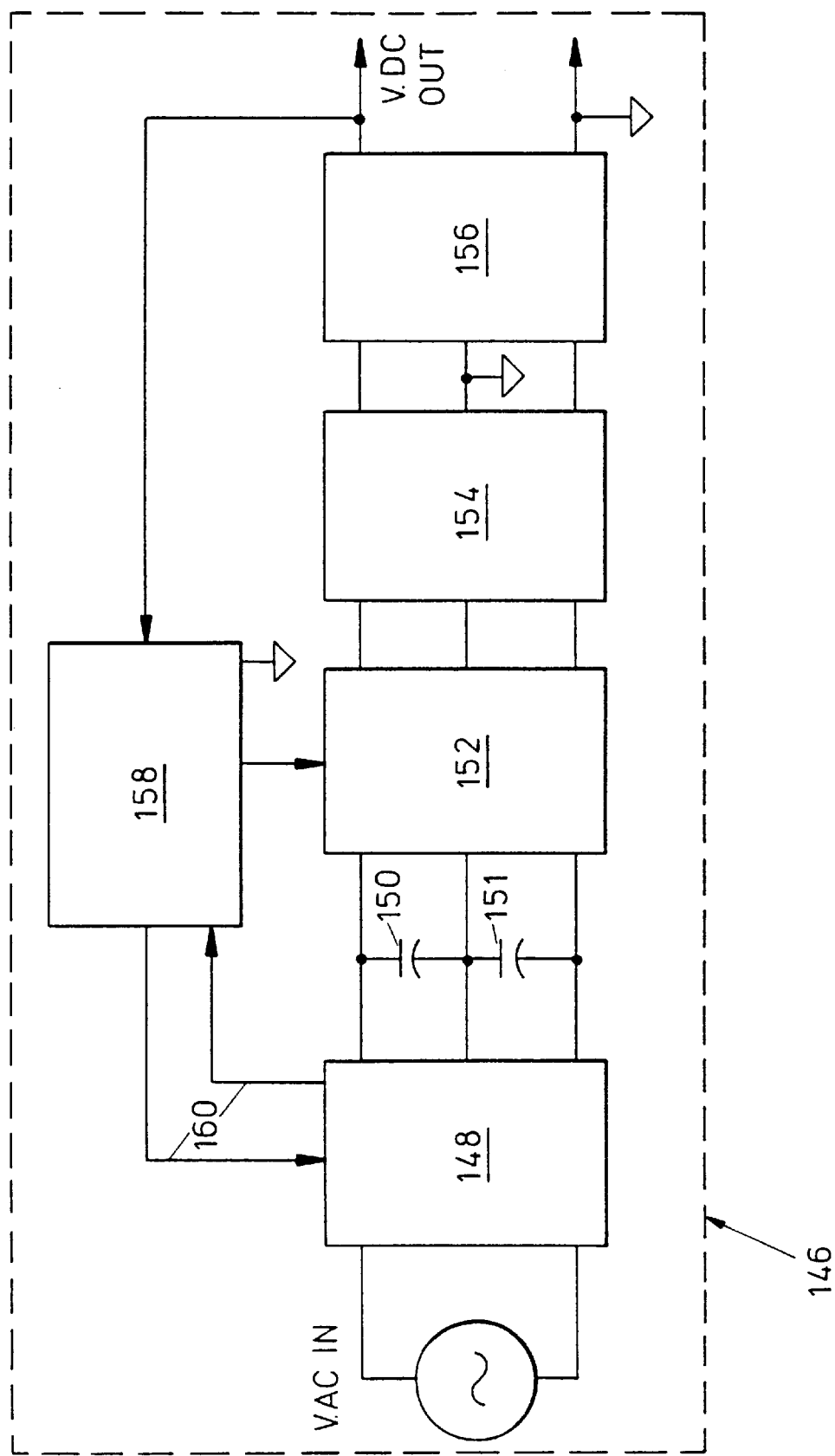
FIG. 8 is a diagrammatic view illustrating an embodiment of the power board of this invention.

Also included in yoke 14 is a power supply board 146, best shown in FIG. 8, mounted behind a portion designated 46 of metal frame 18. Power supply board 146 is the motor and logic power supply for movement of luminaire 10. Power supplied to board 146 may be 100 to 240 VAC (50/60 Hz). A voltage selection rectification 148, changes AC to DC voltage and operates to double the voltage if less than 150 VAC. Output is stored in capacitors 150, 151 and then a half bridge 152 switches the DC back to AC voltage at 40 kHz. The 40 kHz goes into a transformer 154 which steps the voltage down and isolates the live voltage from the low voltage output circuit. The AC voltage is rectified back to DC voltage and filtered via an inductor capacitor arrangement at 156. A voltage mode, pulse width modulator controller 158 is responsible for the feedback of the output voltage and controls the half bridge 152 to produce a constant output voltage. Also, a voltage sensor for doubler circuit control is provided at 160.

Figure 9:
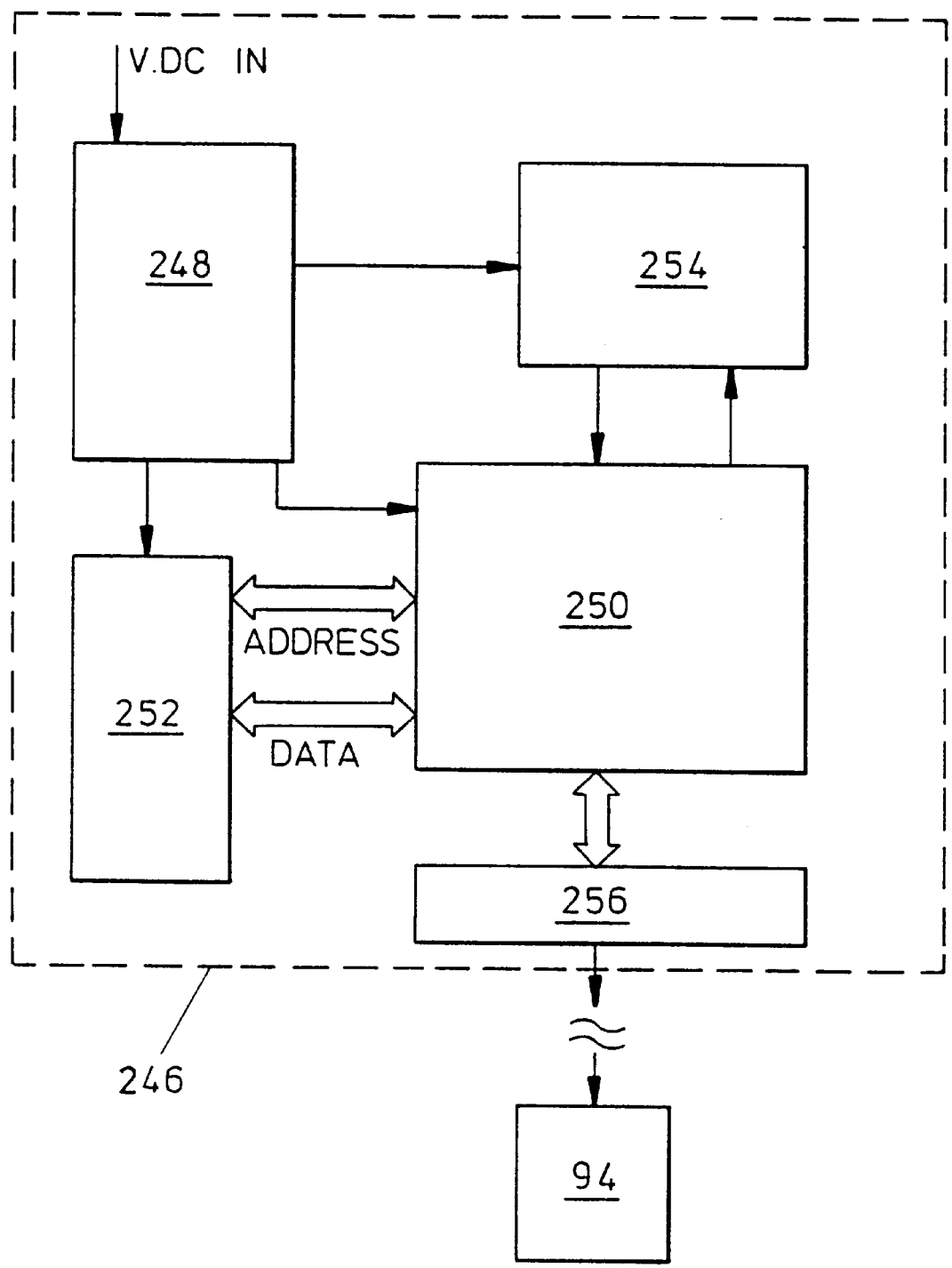
FIG. 9 is a diagrammatic view illustrating an embodiment of the logic board of this invention.

A logic board 246, best shown in FIG. 9, is mounted in yoke 14 behind a portion designated 40, of metal frame 18. The logic board is operably connected to a controller and controls the above-mentioned pan and tilt, and also controls color wheels, etc., and other operable components of the luminaire 10. Power from power board 146 is fed to logic board 26 at from about 9 VDC to about 40 VDC through a voltage regulator circuit 248. The power is then communicated to a commercially available embedded microprocessor 250. The power is also communicated to a memory block 252 which comprises 3 different types of memory including Static RAM Flash ROM and EPROM. The memory 252 is utilized by the microprocessor 250 to perform read/write operations on the code and data stored in the 250 memory which signals pan and tilt commands to luminaire 10. A serial transceiver 254 provides RS 485 compatible signals to industry standard USITT DMX-512 controllers and exchanges (receives and transmits) information with microprocessor 250. A slave serial module 256 receives information from microprocessor 250 and serializes data received and sends it out over 5 wires to slave modules including motor driver/sensor boards 94 which include infrared photo interrupter sensors 257, FIG. 3, which respond to tabs and/or notches on component parts of luminaire 10 such as notch 34*a* formed in gear 34, FIG. 2 or tab 86*a* on color filter 86, FIG. 3, which tells the microprocessor 250 the initial (zero or homing) position of motors 26, 82, respectively. The serial module 256 retrieves the position information from sensors 257 and sends it to the microprocessor 250 which determines whether to continue to move the filter or gear or to took for the tab/notch.

A stationary lens 96, is mounted in bezel 58, best shown in FIG. 1. Lens 96 is a common light diffusing lens similar to a lens used in an automotive headlight. Such lenses are commercially available. The above described combination of rotating lens 88 and stationary lens 96 provide a beam angle which is preferably from about 10 degrees to about 60 degrees. This can be varied by rotation of rotating lens 88 and enhanced by interchanging a selected diffusing lens 96.

While this invention has been illustrated and described in accordance with a preferred embodiment, it is recognized that variations and changes may be made therein without departing from the invention as set forth in the claims.

Having described the invention, what is claimed is:

1. A lens system for modifying the cross-sectional geometry of a projected light beam comprising:

a lenticular lens with lenticular elements having an angular orientation as viewed by the light beam;

a rotatable mounting for the lenticular lens which positions the lens relative to the light beam so that only a portion of the lens will intercept the light beam and as the lens rotates different portions of the lens intercept the light beam wherein the angular orientation of the elements changes relative to the light beam can vary between zero and over 180 degrees; and a second moveable lenticular lens with lenticular elements wherein the second lens is moveable relative to the light beam such that the lens passes through different portions of the light beam.

2. A lens system for modifying the cross-sectional geometry of a projected light beam comprising:

a lenticular lens with lenticular elements having an angular orientation as viewed by the light beam;

a rotatable mounting for the lenticular lens which positions the lens relative to the light beam so that only a portion of the lens will intercept the light beam and as the lens rotates different portions of the lens intercept the light beam wherein the angular orientation of the elements changes as the lens moves relative to the light beam; and a second lenticular lens with lenticular elements, and a second rotatable mounting for the second lens which positions the second lens relative to the light beam so that only a portion of the second lens will intercept the light beam and as the second lens rotates different portions of the second lens intercept the light beam wherein the lenticular elements of both lenses have angular orientations as viewed by the light beam wherein the respective angular orientation of the elements changes as the respective lens rotates relative to the light beam whereby the two lenses can be used in combination or in series in the light beam.

3. The lens system of claim 2 wherein the lenses can be rotated into the light beam in series so that the angular orientation of the lenticlular elements as viewed by the light beam rotate over 270 degrees.

4. The lens system of claim 2 wherein the lenses can be rotated into the light beam in series so that the angular orientation of the lenticular elements as viewed by the light beam rotate at least 180 degrees.

5. The lens system of claim 2 wherein the lens can move relative to the light beam into a position where the light beam is uninterrupted by the lens.

6. The lens system of claim 4 wherein the second lens can move so that the orientation of the lenticular elements as viewed by the light beam can complete the 360 degree rotation where a portion of the plurality of degrees of rotation is accomplished by the first lenticular lens.

* * * * *